United States Patent
Simotas et al.

(10) Patent No.: US 10,523,453 B2
(45) Date of Patent: Dec. 31, 2019

(54) MANAGING CONTENT CASTING

(71) Applicant: MCOM MEDIA COMMUNICATIONS DMCC, Dubai (AE)

(72) Inventors: Eleftherios Simotas, Kifissia (GR); Konstantinos Sakellariou, Vari (GR); Ioannis Aglamisis, Salonika (GR); Peter Politopoulos, Ilia (GR)

(*) Notice: Subject to any disclaimer, the term of this patent is extended or adjusted under 35 U.S.C. 154(b) by 0 days.

(21) Appl. No.: 16/211,428

(22) Filed: Dec. 6, 2018

(65) Prior Publication Data

US 2019/0182060 A1    Jun. 13, 2019

Related U.S. Application Data

(63) Continuation-in-part of application No. 15/834,265, filed on Dec. 7, 2017.

(51) Int. Cl.
| | | |
|---|---|---|
| *H04L 12/18* | (2006.01) | |
| *H04L 29/06* | (2006.01) | |
| *H04L 29/12* | (2006.01) | |
| *H04L 29/08* | (2006.01) | |
| *H04B 7/14*  | (2006.01) | |

(52) U.S. Cl.
CPC .............. *H04L 12/18* (2013.01); *H04B 7/14* (2013.01); *H04L 61/1511* (2013.01); *H04L 61/1541* (2013.01); *H04L 61/2503* (2013.01); *H04L 63/0281* (2013.01); *H04L 63/0876* (2013.01); *H04L 65/60* (2013.01); *H04L 67/28* (2013.01); *H04L 61/6022* (2013.01)

(58) Field of Classification Search
CPC ..... H04L 12/18; H04L 65/60; H04L 61/2503; G06F 3/1454; H04H 20/08; H04H 20/59
See application file for complete search history.

(56) References Cited

U.S. PATENT DOCUMENTS

| | | | | |
|---|---|---|---|---|
| 2007/0180485 | A1* | 8/2007 | Dua | H04L 29/06027 725/114 |
| 2007/0217436 | A1* | 9/2007 | Markley | H04L 12/2803 370/401 |
| 2008/0313691 | A1* | 12/2008 | Cholas | H04N 21/4147 725/131 |
| 2010/0146085 | A1* | 6/2010 | Van Wie | H04L 12/00 709/220 |
| 2010/0177894 | A1* | 7/2010 | Yasuma | H04L 63/0428 380/255 |
| 2011/0176555 | A1* | 7/2011 | Poder | H04L 65/605 370/463 |
| 2013/0346564 | A1* | 12/2013 | Warrick | H04L 41/0816 709/219 |

(Continued)

*Primary Examiner* — Khaled M Kassim
*Assistant Examiner* — Syed Ali
(74) *Attorney, Agent, or Firm* — Franco S. Deligueri; DP IP Group

(57) ABSTRACT

Techniques are provided to manage the casting of content from user devices to media playback devices. The proposed approach employs intermediate network components that intercept and manipulate session and configuration protocol traffic according to network rules. Enforcement of such rules ensures user devices only discover and cast content to allowed media playback devices. The proposed techniques support casting to local and remote public and private media playback devices and also regulate media playback device reconfiguration.

14 Claims, 11 Drawing Sheets

(56) References Cited

U.S. PATENT DOCUMENTS

| | | | |
|---|---|---|---|
| 2015/0372875 A1* | 12/2015 | Turon | H04W 76/10 370/254 |
| 2016/0337426 A1* | 11/2016 | Shribman | H04L 65/4084 |
| 2017/0019394 A1* | 1/2017 | Yastrebenetsky | H04L 63/0236 |
| 2018/0262792 A1* | 9/2018 | Mackay | H04N 21/4302 |

* cited by examiner

| | Source MAC | Dest MAC | Source IP | Dest IP | Source Port | Dest Port | Protocol | Message |
|---|---|---|---|---|---|---|---|---|
| 392 | <DeviceMAC> | a0:ce:c8:04:e5:3b | <Device IP> | 224.0.0.251 | 5353 | 5353 | MDNS | Standard query 0x0000 PTR _googlecast._tcp.local, QM" question" |
| 394 | <ChromecastMAC> | a0:ce:c8:04:e5:3b | <ChromecastIP> | 224.0.0.251 | 5353 | 5353 | MDNS | Standard query response 0x0000 PTR Chromecast-a3b5554cf9b508847362182961f9b2a8._googlecast._tcp.local TXT, cache flush SRV, cache flush 0 0 Name: 8009 a3b5554c-f9b5-0884-3736-218296f9b2a8.local, Type: A Address: <ChromecastIP> |
| 396 | <CCProxyMAC> | <DeviceMAC> | <CCProxyIP> | <DeviceIP> | 5353 | 5353 | MDNS | Standard query response 0x0000 PTR Chromecast-a3b5554cf9b508847362182961f9b2a8._googlecast._tcp.local TXT, cache flush SRV, cache flush 0 0, Name: 8009 a3b5554c-f9b5-0884-3736-218296f9b2a8.local, Type: A, Address: <ChromecastIP> |

MANAGING CONTENT CASTING

CROSS-REFERENCE TO RELATED APPLICATION

This application is a continuation-in-part of and claims the benefit of priority to U.S. patent application Ser. No. 15/834,265, filed Dec. 7, 2017.

BACKGROUND

Field

The present invention relates to managing content casting, and in particular to managing media playback device discovery by source devices and regulating the casting of content and the reconfiguration of media playback devices in public and private spaces.

Background

Media casting technologies are used to stream content to media playback devices connected to TVs or audio systems. Media casting technologies offer a new way to manage the playback of such content and a unified control to access content from distributed sources such as cable TV, Internet channels, YouTube™, etc. At the same time, media casting technologies allow users of mobile devices, and networked devices in general, to stream content stored at their devices or at the cloud to media playback devices for viewing at TVs. Typically, such media playback devices connect to TVs via HDMI ports, allowing the media playback devices to take control of the TVs, and take power through integrated USB ports.

Examples of media playback devices include Google Chromecast™, Apple TV™ and Amazon Fire TV™, to name the three main contenders in the media casting industry. All these three casting devices employ proprietary casting protocols allowing applications supporting these protocols to cast content and control the operation of the casting devices through session and control protocols. Another functionality offered by Google Chromecast™ is the mirroring of content from its Chrome™ web browser and the screens of compatible mobile devices to Chromecast™ media playback devices.

These devices were primarily designed for use at home and other private environments where the user is able to cast content to any or all the available local media playback devices in his environment. In such a usage scenario, the user's networked device (e.g. his smart phone) and the media playback devices are all connected to a local area network such as a WiFi network. Typically, the same WiFi network is used to connect all devices. This setup allows the user device to discover all networked local media playback devices and connect to any number of such devices for casting content. Third-party media playback devices, e.g. at a nearby apartment or office are not discoverable by the user's device, as third-party media playback devices connect to a different WiFi network than the user's device. As a result, the user can only cast content to his media playback devices.

Newer extensions to the above usage scenario include the use of media playback devices in public environments, such as hotel rooms, where the user is expected to connect his networked device to the media playback device(s) located in his room. For example, Chromecast™ has accommodated this usage scenario by offering a "guest mode" feature. This feature enables a user device to discover a nearby media playback device by detecting ultrasonic signals emitted by the TV or speaker system to which the media playback device is connected. However, this solution only allows the pairing of a source device with just a single media playback device (at a time) and only when both source and playback devices are near to each other, therefore limiting the use cases and functionalities that can be accommodated.

In a modified usage scenario for TVs and audio systems not capable of ultrasound generation, the user device may be paired with a media playback device using a PIN code (usually 4 digits). Pairing using codes is well known with some such techniques having been described in U.S. Pat. No. 9,369,829, by Zerr et al.

Once paired and a connection is established, the user device is able to cast content, control access to network channels (e.g. Netflix™ etc.), control the operation and alter the configuration of the media playback device.

Being connected in this way in public settings offers users the simplicity of controlling in-room media playback devices, as well as available TVs and audio systems. However, this can also create problems. Because all media playback devices are connected via Layer 2 to the same network as the user's device, all such media playback devices—even those not located in the user's room—are discoverable by the user's device and therefore open to connection with the user's device. This is not allowable as the user device must only be able to connect to and cast content only to the media playback devices in his room.

Failure to regulate the discoverability of the media playback device may result in confusion to the user. Failure to regulate the casting to media playback devices in his room may also result in other guest discontent as they may lose control of their TVs or audio systems. Additionally, privacy issues may arise when casting private content or issues like indecency when casting censored content where it may be accidentally viewed by guests in their rooms. There is, therefore, a need to control and limit the list of media playback devices that user devices can discover; and, also, to regulate content casting to only those media playback devices located in a user's guest room. Until now, the way to control access is limited only by the protection provided by the authentication provided by employing pairing codes as part of the pairing process between two devices.

Furthermore, once a user device is connected to a media playback device, the user's device can cast content as desired. The user's device can also, however, change the configuration of the media playback device to a new configuration that is not intended by the hotel. This could create problems as the hotel should reconfigure the media playback device before the room is occupied by the next guest or even during the stay of the original guest, resulting in additional maintenance, man hours and costs.

Currently media playback devices supporting casting are used in association with a pairing mechanism aimed at verifying a user device is in the vicinity (e.g. inside the same guest room) of the media playback device. This is needed to identify the device to which to cast content. There are situations, however, when a user located, for example, at one's office (or at any similar public place) and wants to cast content to his media playback device at home for his family and friends to view his content.

Current technology does not allow this to happen as the user's device is not connected to the same local area network as his media playback device and as a result the media playback device cannot be discovered by the user's device. In addition, given conventional pairing limitations, when it is desirable for source and media playback devices to connect to different local area networks, devices need to be physically proximal to each other for this to work. Furthermore, there is no known casting of devices not only to local area networks but also to other types of networks, such as private networks or the Internet, or networks in general that are geographically distant from one another.

There is, therefore, a need to manage content casting in both private and public environments by regulating the media playback devices that the user device can discover and connect to and to regulate the reconfiguration of such media playback devices. This need covers devices regardless of their physical proximity or network topologies and usage scenarios.

SUMMARY

The present disclosure is directed to techniques to manage the casting of content from user devices to media playback devices connected to display devices. The proposed approach ensures user devices only discover and cast content to allowed media playback devices by introducing intermediate components and enforcing network rules adapted to use case scenarios.

According to an example embodiment, user devices and media playback devices connect over different local area networks, respectively, to a proxy component. The proxy component is in communication with a control component and the proxy component creates and enforces network rules. These rules selectively allow the media playback devices to be discovered by and paired with the user's device; these rules also allow routing of session protocol data for content casting between the paired devices, and selectively blocking configuration protocol data for regulating media playback device reconfiguration.

A first use case scenario using the present innovative solution comprises a hotel guest pairing his device with a media playback device connected to a TV in his room. Once paired, the user can cast content from his devices to the media playback device in his room.

A second use case scenario extends the first use case scenario by allowing a hotel guest's device to discover more than one media playback devices associated with the same guest room. The user's device and the media playback devices can be paired for content casting either by treating the media playback devices as a single group of devices or by sequentially pairing each of the in-room media playback devices to the guest's device.

A third use case scenario involves the use of the present solution in public spaces. Under this scenario, a user can pair his device with media playback devices in a conference hall or exhibition area for casting a presentation. The casting is controlled by network rules constructed in accordance with a presentation schedule or other data. The same use case may concern a retail space scenario where the user, typically a salesperson, casts content to media playback devices located inside the store. The aim is to identify a user's interest in a product or product category and to provide him with casted advertisement and/or incentives to convert this interest into a sale. This scenario is controlled by network rules at the proxy server. The proposed rules combine data from sensors tracking the user in the retail space and from product location maps.

A fourth use case scenario involves users casting streaming content to paired media playback devices. In this scenario, media playback devices are connected to encoders. The media playback devices feed the encoders with a live stream of the casting content. The output of the encoders is sent as a live IPTV channel to multiple TVs.

A fifth use case scenario involves casting content from a remote user's device. The remote device connects to a proxy server via a general Internet connection; in contrast to connecting to a local area network. Under this scenario, a user can, for example, cast content to a media playback device of a friend, where the latter's media playback device is connected to a geographically distant private local area network from the user casting the content.

BRIEF DESCRIPTION OF THE DRAWINGS

FIG. 4 shows the messages exchanged when setting up a casting session.

DETAILED DESCRIPTION

Figure 1:
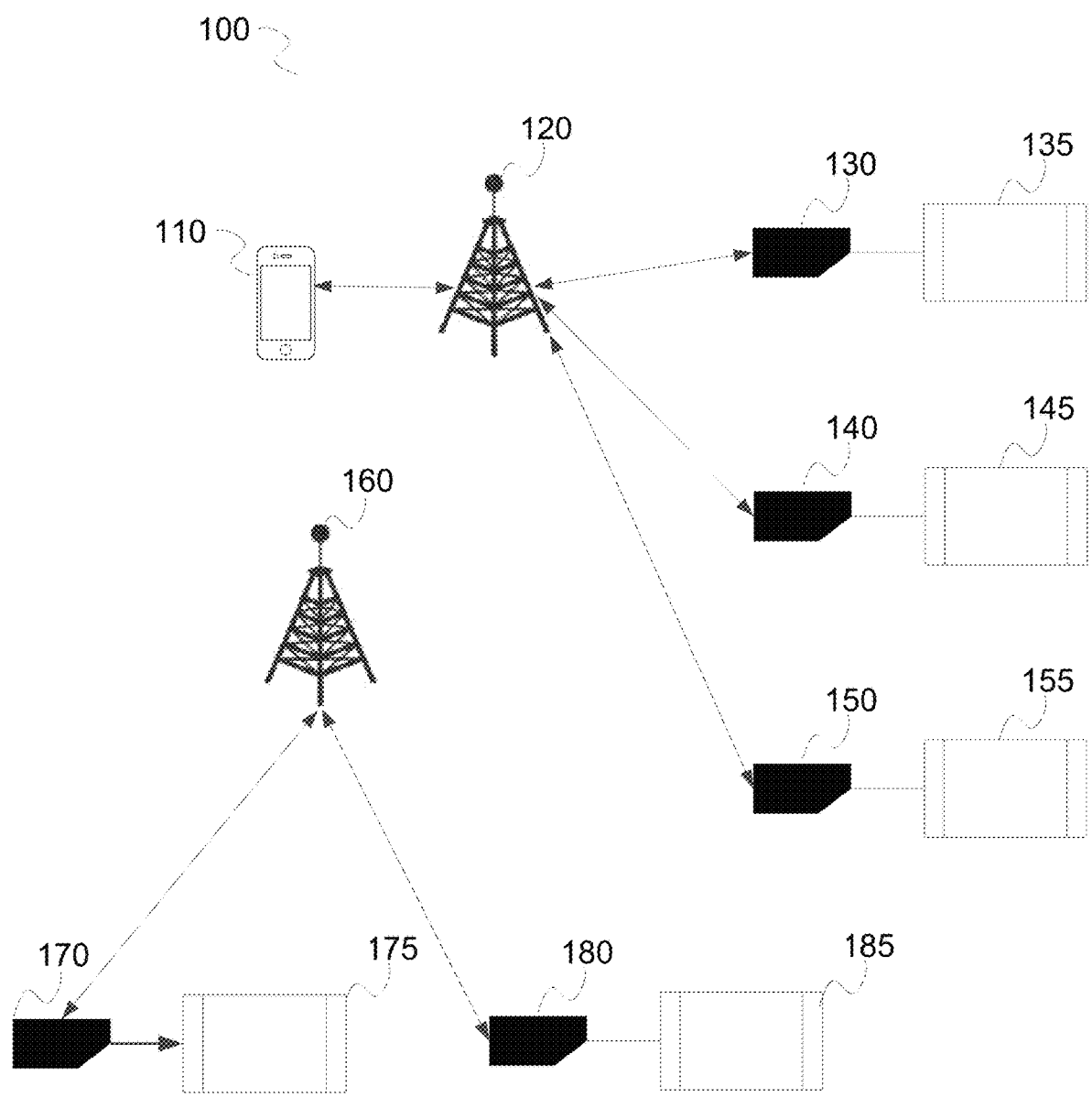
FIG. 1 illustrates a system for media casting.

The word "exemplary" is used herein to mean "serving as an example, instance, or illustration". Any embodiment described herein as "exemplary" is not necessarily to be construed as preferred or advantageous over other embodiments.

The terms "user device", "mobile device" and "source device" are used interchangeably and have the same meaning.

The terms "media playback device" and "target device" are used interchangeably and have the same meaning.

Terms not specifically defined herein have their art recognized meaning.

As used herein and in the appended claims, the singular forms "a" and "the" include plural referents unless the context clearly dictates otherwise. Thus, for example, reference to "a/the user device" includes a plurality of user devices known to those skilled in related art.

The acronym "ARP" is intended to mean "Address Resolution Protocol".

The acronym "CD" is intended to mean "Compact Disc".

The acronym "CD-ROM" is intended to mean "Compact Disc Read Only Memory".

The acronym "DHCP" is intended to mean "Dynamic Host Configuration Protocol".

The acronym "DNS" is intended to mean "Domain Name Server".

The acronym "DSL" is intended to mean "Digital Subscriber Line".

The acronym "DVD" is intended to mean "Digital Versatile Disc".

The acronym "EEPROM" is intended to mean "Electrically Erasable Programmable Read Only Memory".

The acronym "ERP" is intended to mean "Enterprise Resource Planning".

The acronym "HTTPS" is intended to mean "Hyper Text Transfer Protocol Secure".

The acronym "IEEE" is intended to mean "Institute of Electrical and Electronics Engineers".

The acronym "IP" is intended to mean "Internet Protocol".

The acronym "IPv4" is intended to mean "Internet Protocol version 4".

The acronym "JSON" is intended to mean "JavaScript Object Notation".

The acronym "LAN" is intended to mean "Local Area Network".

The acronym "MAC" is intended to mean "Media Access Control".

The acronym "mDNS" is intended to mean "multicast Domain Name System".

The acronym "NAT" is intended to mean "Network Addressing Translation".

The acronym "Net" is intended to mean "Network".

The acronym "OS" is intended to mean "Operating Systems".

The acronym "PTR" is intended to mean "PoinTer Record".

The acronym "QR" is intended to mean "Quick Response".

The acronym "RF" is intended to mean "Radio Frequency".

The acronym "RAM" is intended to mean "Random Access Memory".

The acronym "ROM" is intended to mean "Read Only Memory".

The acronym "SD" is intended to mean "Source Device".

The acronym "SSDP" is intended to mean "Simple Service Discovery Protocol".

The acronym "SSID" is intended to mean "Service Set IDentifier".

The acronym "TD" is intended to mean "Terminal Device".

The acronym "TXT" is intended to mean "TeXT".

The acronym "URL" is intended to mean "Universal Resource Locator".

The acronym "VLAN" is intended to mean "Virtual Local Area Network".

The acronym "XML" is intended to mean "eXtensible Markup Language".

The present disclosure describes improved techniques for managing media casting in a variety of environments, including public settings. The management of media casting as proposed involve, inter alia, managing (i) the discovery of media playback devices (also termed "target devices") by user devices (also termed "source devices") and (ii) the creation of casting session between the two types of devices. The configuration of target devices by source devices is also regulated to avoid problems.

A source device may be any type of networked device, including smart phones, tablets, laptops, or other computing device or smart device. A target device may be any type of media playback device, including casting devices such as Google Chromecast™, Apple TV™, Amazon Fire TV™ or other. Target devices can be connected to display devices like TVs using a standard wired connection. An HDMI connection is most common given this is a common IO interface found on TVs and display devices in general.

FIG. 1 illustrates a system for media casting. System 100 comprises source "S1" 110 and target devices 130, 140 that communicate with each other via a Local Area Network 120 (LAN), typically a wireless LANs like a WiFi (e.g. a WiFi using the IEEE 802.11 WiFi family of network protocols). Additional source device (not shown in FIG. 1) may also connect to the network 120. Such types of networks can guarantee easy connectivity since they are supported by virtually all modern devices featuring wireless network connectivity capabilities, and such networks provide adequate bandwidth to support real time streaming media. In such a network environment both the source and target devices may connect to the same Layer 2 network, say network "N1" 120.

In order to discover available (i.e. connected) target devices for casting content, the source device S1 110 sends discovery messages (i.e. service queries) on the local network N1 120 where S1 is connected. These messages are structured as multicast Domain Name System (mDNS) messages.

The target devices 130, 140 (e.g. T1, T2) may advertise themselves to the N1 120 WiFi network by sending multicast service advertisements based on multicast Domain Name System DNS (mDNS) service discovery messages.

mDNS messages are normally restricted to a single Layer 2 network (or "broadcast domain") and do not propagate to other Layer 2 networks. Thus, service discovery messages (from source devices) are restricted to the N1 network 120 and service advertisement messages (from the target devices) are also restricted to N1 network 120. As a result, the source device S1 110 can discover the target devices 130, 140 (T1, T2) but it is not possible for S1 110 to discover other target devices 170, 180 (T4, T5) connected to a second WiFi network "N2" 160 (and to TVs 175, 185, respectively). With this arrangement, the source device S1 110 can discover a target device T1 130 and request to cast content to T1 130, thereby opening a casting session based on the casting protocol supported by T1 130 (e.g. Google Cast, Apple Airplay, etc.). This is typically done by an application installed in S1 110 which supports the same casting protocol as T1 130. Alternatively, opening a casting session may be done by a web browser running at S1 110 opening an appropriate webpage, where the browser has a plug-in supporting the same casting protocol as T1 130.

The above setup is excellent for use in private environments where the owner of the source device 110 is also the owner (or at least the only user) of the target device(s) 130. If for example multiple target devices 130, 140 (T1, T2) are connected to N1 120, the source device 110 is able to discover both 130 and 140 (T1 and T2) and establish casting sessions with both 130, 140. This is not, however, desirable in the case of a public area, where several target devices exist but only a subset of the target devices should be discoverable by S1 110 and only one target device T1 or a subgroup of the connected target devices should be accessible for content casting.

Let's consider a situation where the user of S1 110 is a hotel guest at room 101. Inside room 101 there is a target device T1 130 connected to a TV 135. The target device 130 is discoverable by the source device 110. Similarly, the second target device 140, also located in room 101 and connected to TV 145, is discoverable by the source device 110. The user (i.e. the hotel room guest) of the source device 110 may select which target device 130, 140 to connect to and cast content. There may also be a third target device T3 150 connected to a TV 155 and to the same network N1 120 as the first two source devices 110, 120. T3 150 may be located in room 102 which is occupied by a second guest, other than the guest at room 101. It is not desirable that the first source device 110 of the guest at room 101 be allowed to discover the target device 150 in room 102 nor be able to establish a casting session with target device 150. However, seeing as both S1 110 and T3 150 are connected to the same network N1 120, S1 110 will indeed be able to discover T3 150 in the absence of a mechanism to prevent it from doing so. Such a mechanism cannot exist in the system 100 as the networking protocols are controlled by Operating Systems (OS) and native OS applications that are not open to third party programmers or administrators.

At the same time, target devices T4 170 and T5 180 are located in rooms 103 and 201, respectively, and are connected to TVs 175 and 185, respectively. Both T4 170 and T5 180 are connected to WiFi network N2 160. Because these target devices 170, 180 are connected to a different network N2 160 than N1 120 where the source device S1 110 is connected, S1 110 cannot discover or cast content neither to T4 170 nor to T5 180 despite the fact that N1 120 and N2 160 may be connected to each other via a local network or the Internet.

To avoid the problems described for the system 100 of FIG. 1, a modified system can be designed. Such a system comprises source and target devices as in FIG. 1. However, the source device and the target devices may be connected to two different WiFi networks. A first network for the source device and any other source devices belonging to other users (e.g. guests staying in other hotel rooms) and a second network for all target devices, regardless of the physical location of the target devices (i.e. regardless of the guest room a target device is located). In a modification of this exemplary embodiment, a first subset of the source devices may connect to a second network and a second subset of the source devices may be connected to a third network.

Figure 2:
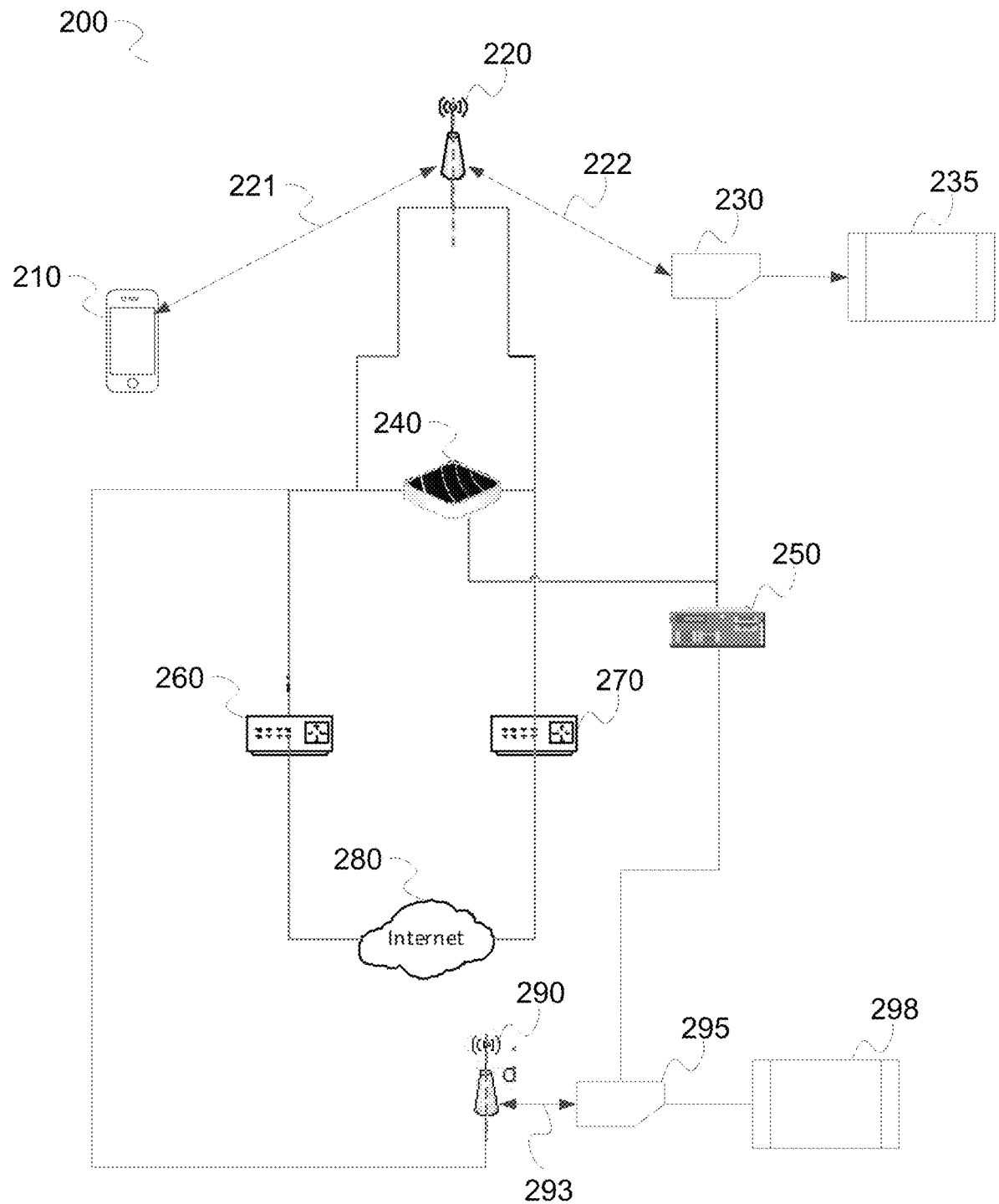
FIG. 2 illustrates a system for media casting management.

FIG. 2 illustrates a system for media casting management. For sake of simplicity, system 200 is shown only with a single source device connected to a first network and two target devices, connected to a second and a third network. A mobile (source) device 210 is connected to the first wireless network 220 via a first Service Set IDentifier (SSID1) which SSID1 is mapped to first Local Area Network (LAN1).

LAN1 may be a first physical LAN or a first Virtual LAN (VLAN1 221) dedicated to connecting source devices owned by hotel guests. Additional Source devices could connect to VLAN1 using SSID1. A first target device 230 is connected to a second wireless network 220 with a second SSID2 which is mapped to a second Local Area Network (LAN2 222).

LAN2 may be a second physical LAN or a second Virtual LAN (VLAN2 222) dedicated to connecting target devices installed at hotel rooms.

VLAN1 allows the same physical network 220 (i.e. the same WiFi antenna and associated hardware) to be used in setting additional virtual networks (e.g. VLAN2 222), which operate as distinct networks from VLAN1 221. In the present exemplary embodiment, VLAN2 222 is associated with SSID2 and is dedicated to target devices for connecting to the local network, such as the first target device 230. Additional target devices could connect to VLAN2 using SSID2. The first target device 230 is also connected to a TV 235 via an HDMI or other connection means, wired or wireless. VLAN1 221 and VLAN2 222 provide address, gateway and Domain Name Server (DNS) information e.g. via the Dynamic Host Configuration Protocol (DHCP) and connectivity to the Internet via a router 260 or 270, which router acts as the default gateway and DNS proxy for VLAN1 and VLAN2. Additional virtual LANs may exist in large installations where large numbers of source and/or target devices need to connect.

The first and second WiFi networks VLAN1 221, VLAN2 222 connect via the first physical network 220 to a local proxy server 240. The local proxy server 240 is also connected to a control server 250. In a modified implementation of the current exemplary embodiment, both the local proxy server 240 and the control server 250 may be implemented as virtual servers.

The system 200 may also comprise a second physical network 290, which network may be associated with a third SSID3 for a third LAN (e.g. VLAN3 293). The second physical network 290 (and VLAN3 293) may be dedicated to connecting a set of target devices. A third target device 295 is able to connect to VLAN3 293 and to TV 298, e.g. via an HDMI connection.

VLAN3 293 provides address, gateway and Domain Name Server (DNS) information via the Dynamic Host Configuration Protocol (DHCP) and connectivity to the Internet via a router 260, which router acts as the default gateway and DNS proxy for VLAN3. The second physical network 290 may also be associated with additional SSIDs and VLANs in large installations where large numbers of target devices need to connect.

Routers 260, 270 are connected to the Internet 280 for providing access to remote servers, to the cloud and to remote content and control resources.

System 200 is designed to separate source from target devices in the sense that they are connected to different LANs. This way, the target devices are not visible to the source devices as the mDNS discovery and service advertisement messages do not propagate outside the Layer 2 of their originating networks. Relaying mDNS messages between the various networks is done by the local proxy server 240 according to network filtering rules used by the local proxy server 240.

Figure 3A:
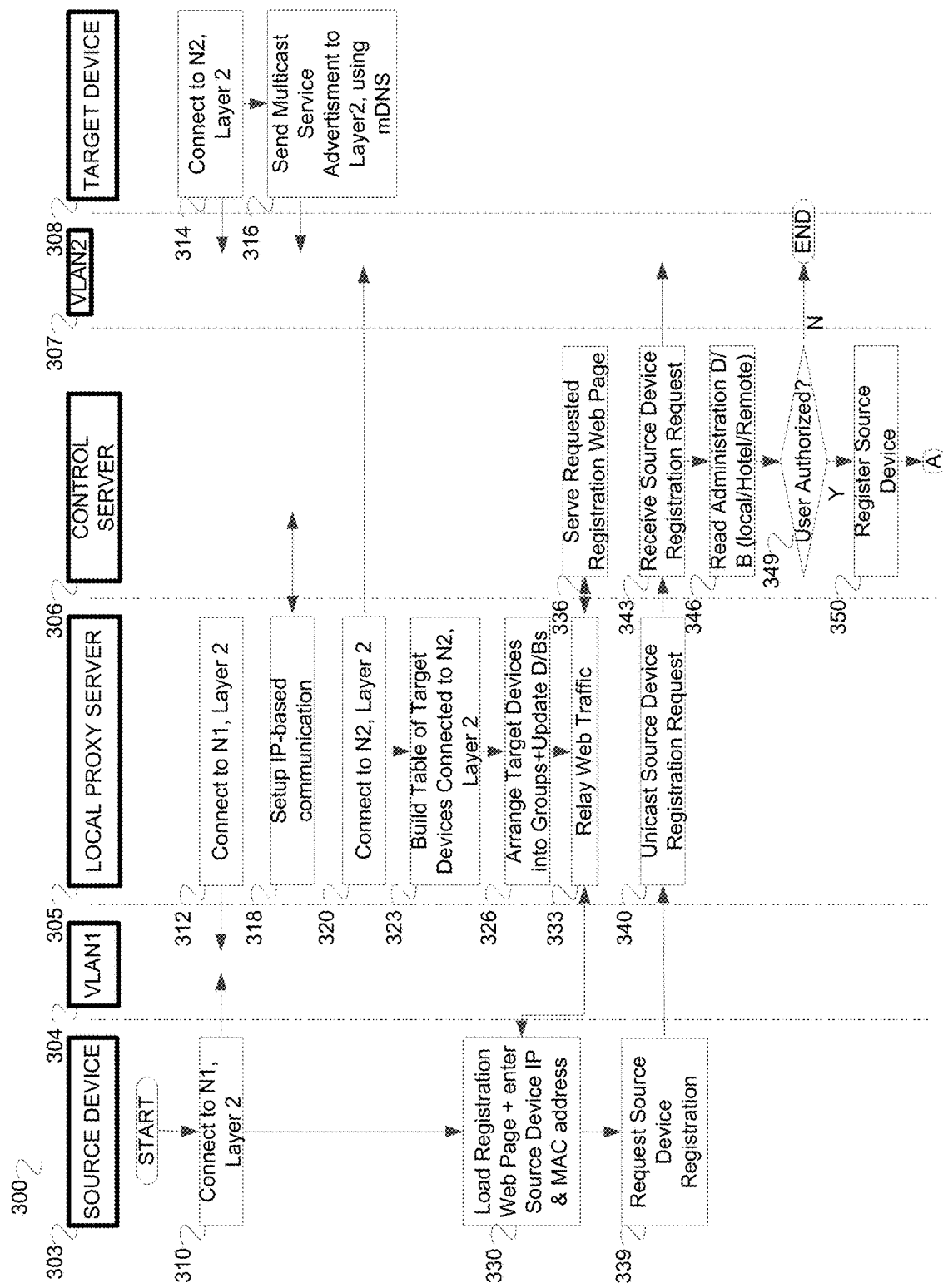
FIGS. 3A and 3B are operational flow diagrams illustrating casting management in accordance with an exemplary embodiment of the present invention.
Figure 3B:
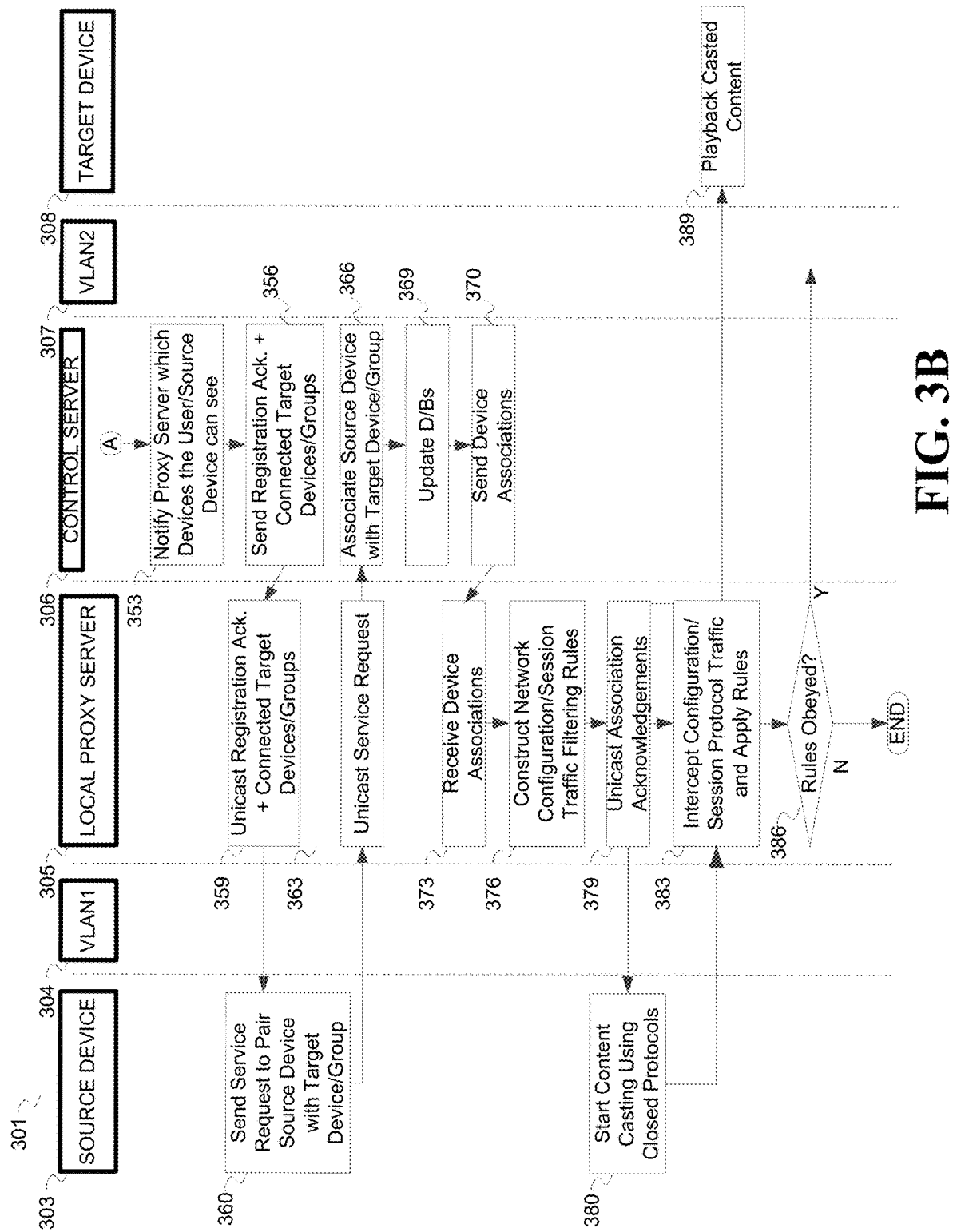

FIGS. 3A and 3B are operational flow diagrams illustrating casting management in accordance with an exemplary embodiment of the present invention.

mDNS Device Discovery Service

Referring to flowchart 300 of FIG. 3A, a target device 308 connects 314 to a VLAN2 (N2) 307 and to a local proxy server 305, while the local proxy server 305 also connects 320 to VLAN2 (N2). Source device 210 connects 310 to a VLAN1 (N1) 304 and to the local proxy server 305. The local proxy server 305 also connects 312 to VLAN1 (N1). The local proxy server 305 may setup an IP connection 318 to a control server 306.

The control server 306 may be a server or a service management component connected to a reservation system or an Enterprise Resource Planning (ERP) system hosted by the hotel (or a hotel group management headquarters, or other entity) for managing reservations and logging guest, room, and other data such as pay services etc.

The control server 306 typically maintains a first database containing among other entries some of the following data:
- the media playback devices located in each available guest room
- whether the room is occupied (checked-in)
- identification information that guests need to use on their mobile devices to verify they occupy a specific room (e.g. an authorization code)

The first database, or a second database, at the control server 306 may store data relating to the source devices allowed to discover, pair and cast content to the media playback devices in each guest room.

The control server 306 also manages the authorization process to allow a source device to gain access to media playback devices in a guest room. The control server 306 may receive requests (via the proxy server 305) from source devices requesting permission to access the media playback devices in a guest room and using an appropriate registration/validation mechanism allow the control server to decide which source devices can access the media playback devices. In this way, a "guest room" may be viewed as a logical grouping of media playback devices and a "guest" as a user authorized to access this group of media playback devices.

The local proxy server 305 may receive data stored in the control server 306 and store them in non-volatile storage and/or volatile memory, e.g. in the form of tables, databases or any other known data structure, including data files, eXtensible Markup Language (XML) files and/or JSON files.

The local proxy server 305 runs a discovery service for each of its VLAN interfaces for discovering target devices. The discovery service listens for mDNS advertisements 316 sent by target devices and also actively performs mDNS probing to discover target devices. The discovery service may be limited to IPv4 announced devices and services.

By way of example, device and service discovery may be done by querying the RR:_services._dns-sd._udp.local. or other device specific queries such as RR_googlecast._tcp.local for Chromecast devices (or other queries for other types of media playback device, e.g. use airplay._tcp.local for Apple TV devices). The discovery service may also periodically log all discovered target devices and services in size- and/or time-limited log files using log rotation.

For each discovered target device, the local proxy server may perform Media Access Control (MAC) address discovery via the Address Resolution Protocol (ARP).

The local proxy server 305 maintains discovered devices and services in databases 323 (or tables or other data structures) stored in memory and/or persistent storage. These databases, may in an exemplary embodiment comprise the following data:
Device Type=known device equipment (e.g. Google Chromecast, Apple TV, etc., or "Uknown" for unknown device type)
Name=the Hostname part of the mDNS PTR response of the target device PoinTer Record (PTR) response
Internet Protocol (IP) address=IPv4 address of the target device
MAC address=resolved from the ARP
Network Interface=the network interface the device was seen at The local proxy server 240 may arrange the discovered target devices into groups 326 using information received from the control server 306. The local proxy server 240 may also maintain records of announced services 323 for each unique target device (i.e. for each unique IP address) using e.g.:
Name, Type, Port, Domain The local proxy server 240 may also record custom attributes; for example, for identified Google Chromecast devices:
device friendly name (where the device friendly name may be parsed from the "fn" field of the TeXT (TXT) record)

Target Device Table—Room Mapping

The control server (or in an alternative exemplary embodiment, the local proxy server) 240 may also maintain an association of the target devices to hotel room numbers (or in the alternative exemplary embodiment, the local proxy server may also maintain an association of the target devices to hotel room numbers based on data received from the control server 306). The association may contain (e.g. for a Google Chromecast device):
Room #, Chromecast Host Name, Friendly Name, Network Interface, Pairing code, Status The local proxy server 305 maintains the associations between authorized source devices and target media playback devices (or groups of playback devices).

It is possible that there may be multiple target devices per room. To facilitate pairing of source and target devices, the control server (or in an alternative exemplary embodiment, the local proxy server) 240 may also store an authorization code table:
Room #, pairing code The creation of the mapping between the source and target devices is part of a separate configuration/source device registration process.

Source Device Registration

Source device registration may comprise the display at the source device of a web page 330, which web page is accessed on a VLAN1 interface of the local proxy server. The page may, for example, be accessible using the Hyper Text Transfer Protocol Secure (HTTPS) protocol only at standard port: 443. This page may be designed to derive the following information from the source device:
User Agent
Device identification based on the subscribed web service (such as useragentapi.com) if configured to do so.
Client IP address
Client MAC address (the MAC address could be derived from the local proxy server 240 ARP tables given the source device's IP address The web page may be designed to display an information page instructing the guest to enter the pairing code. The registration web page may be served by the local proxy 305 or in a variation of the present exemplary embodiment the registration web page may be served 336 by the control server 306 and relayed 333 to the source device 303 by the local proxy 305.

The pairing code may be displayed at the TV that is connected to the target device 308 that the source device 303 wants to pair with before the source device can start a content casting session. This pairing code may be created by the control server 306 and be read by the user of the source device, who then enters the code to a casting enabled application running on the source device 303. The same web page (or menu page) displayed on the TV may provide information to the guest on how to pair his device with the target device connected to the TV, a link to download a casting application to the source device if a cast-enabled application is not already installed in the source device, and a Universal Resource Locator (URL) where the user may manually enter the pairing code. Alternative implementations may include the display at the TV connected to the target device 308 of a Quick Response (QR) code encoding the same URL, which code the user scans with his source device 303. Alternatively, the media playback device or the TV may transmit a Radio Frequency (RF), visual, or audio code that is captured by the source device 303 and is then transmitted to the local proxy server 305.

Upon entry (or capture) at the source device 303 of the pairing code, the pairing code is transmitted to the local proxy server 305 together with a request to register 339 the source device. This request is unicasted 340 to the local proxy server 305 and then received 343 by the control server 306 where it is checked against the target device-room mapping table by reading a hotel administration database 346. When an entered code does not exist 349, the guest is prompted to re-enter pairing code else the registration process ends. In a variation of the present exemplary embodiment, the verification of the pairing code may be done by the local proxy server 305 based on data previously retrieved from the control server 306.

Actions Following the Entry of a Correct Pairing Code

When the pairing code matches a record in the Device Room mapping table 349, the source device 303 is registered 350 by associating the source device MAC address with the Room# that is associated with that pairing code. The user may then be instructed to press a button or select a virtual button displayed at the TV for starting a casting session. In response to the user pressing the button on the TV, the TV may switch its input to the HDMI input connecting the target device.

When the source device's MAC address is already associated with the Guest Room, then a message that the source device is already paired with the guest room may be displayed at the TV connected to the target device and/or the source device. Otherwise, the MAC address association is recorded along with the source device's IP address and a timestamp of when this association happened. A message saying that the guest device is successfully paired to Room# may be displayed at the TV connected to the target device and/or the source device. This association is also logged in a file at the local proxy server 305.

An alternate approach will now be described by reference to flowchart 301 shown in FIG. 3B. Here, control server 306 may notify 353 the local proxy server 305 which devices the source device 303 should be allowed to discover, when this information is not already available at the local proxy server 305. The local proxy server 305 receives this information together with a registration acknowledgement 356 from control server 306.

The local proxy server 305 may then check the status of the guest room target devices (e.g. via a status table or actively via pinging the target devices). If some target devices are not responding the local proxy server 305 may notify the guest with a message and create an alert notification 359.

The source device may then request to pair 360 with an available target device (or group of target devices, e.g. two target devices located in the guest's room) by sending a unicast message 363 to the local proxy server 305. The local proxy server 305 may then notify the control server 306 of the successful association between the source and target devices 366. The control server 306 may then update its databases 369 and send database changes 370 to the local proxy server 305. Upon reception of the database changes 373, the local proxy server 305 constructs or updates network filtering rules 376 for control and sessions protocols used in content casting sessions.

In an alternations scenario, when the pairing code matches a record in the Device Room mapping table 349, the source device 303 is registered 350 by the local proxy server 305 by associating the source device MAC address with the Room# that is associated with the entered pairing code and the local proxy server 305 constructs or updates network filtering rules 376 without interacting with the control server 306. This is possible if relevant information has previously been received from the control server 306 and is stored at the local proxy server 305. The construction or updating of the network filtering rules 376 may be followed by the local proxy server unicasting association acknowledgements 379 to the source device 303 and optionally to the control server 306.

Actions Following Successful Pairing of Source with Target Device

Upon the successful new pairing of a guest device with MAC X and IP address Y for Room N, a rule allowing traffic from IP Y to all target devices in Room N on port e.g. 8009 is inserted in a firewall 376 running at the local proxy server 305. Port "8009" is presented by means of example for the case of Chromecast devices. Other ports may be used instead; for example, for Apple TV or similar type media playback devices. As a result, an appropriate rule is always inserted by the local proxy server for the selected media playback device(s). In public environments or settings, such as in a hotel, additional network rules may be added by the local proxy server to prevent a source device from accessing or modifying any media playback device settings or preferences.

The source device 303 may then start content casting 380. The initiation of content casting may also comprise the guest pressing a cast button on a cast-enabled application supporting the casting protocol of the target device (e.g. Google Cast, Apple AirPlay, etc.). A list of target devices associated with the guest room may be displayed to the guest for choosing one or more target devices for casting his content. In a variation of the present exemplary embodiment, the display of the list of target devices may be omitted, e.g. in a usage scenario where the system 200 has preselected the single target device in the guest room that the guest is allowed to cast content.

Content casting is typically done using closed and potentially encrypted protocols proprietary of the target device (e.g. Google Cast, Apple AirPlay, etc.).

Any mDNS queries for (e.g. a Google Chromecast target device in the guest room) RR_googlecast._tcp.local (or other queries for other types of media playback device, e.g. use airplay._tcp.local for Apple TV devices) originating from IP address Y should be replied by the local proxy server 305 with unicast responses made from the mDNS replies of the target devices in Room N (i.e. replies should be sent to the IP destination address Y of only the source device). This mechanism may be implemented by creating a custom responder module or by manipulating the address fields of original queries from the source device and the response packets from the target devices, or by some other packet filtering/manipulation mechanism.

One may view the above mechanism as:
- the local proxy server 305 intercepting 383 a target device 308 advertisement message to a source device (in response to the source device's discovery message) or a content casting message
- the local proxy server 305 applying its network rules 386 and converting the multicast response of the target device to a unicast response sent only to the source device that issued the discovery message (this is described in detail in FIG. 4)

Actions Following Guest Check-In and Check-Out

Upon guest check-in at the hotel, the control server 306 sets the guest room status to "checked-in", records a check-in timestamp and creates a pairing code for the guest room, which code may be used for pairing the source device with the target device(s) in the guest room. The guest room status, check-in timestamp and pairing code are then sent to the local proxy server 305 for creating and enforcing network traffic rules related to the access of the source device to the guest room target device(s) for content casting.

Upon guest check-out from the hotel, the control server 306 sets the guest room status to "checked-out", records a check-out timestamp, clears the pairing code for the guest room, and sends these data to the local proxy server 305. The local proxy server 305 then clears any source device MAC associations, resets the firewall entries (i.e. the network rules) for the guest room traffic to default values and sends a reboot command to the target device(s).

Actions for a Casting System Administration Web Interface

The system 200 may also provide a web interface that allows a system administrator to use an application for guest/source device access control, managing the unmapped device and the guest room mapped device discovery processes (including device reboot and factory reset management), and accessing analytics data about system 200 usage.

For the guest room-mapped devices, the application may present all the devices currently mapped to the guest rooms. It may also show information and status such as:

Friendly name
VLAN (if multiple VLANs are configured)
Reachable (i.e. pingable)
Checked-in/checked-out
Pairing status (including access to the list of MAC addresses paired to devices)

Access to the application may be controlled by a suitable mechanism, e.g. password controlled entry, or other control mechanism commonly used in related prior art. For each target device the application may issue a command to reboot or factory reset the target device using the same user verification process or requiring additional credentials for verification. The application may also present a general Internet connectivity status for the VLAN subnet.

The analytics data could, for example, comprise:
Pairing Statistics (e.g. information on pairing events initiated by source devices)
Casting Session Statistics (e.g. information on the quantity and duration of casting sessions)
Internet Usage Statistics for the target devices
Guest Device Identification (e.g. collection of device type information on guest devices from pairing attempts)
Content Identification (e.g. the type of content being played by the media playback device
Application Identification (e.g. the type of application running at the media playback device FIG. 4 shows the messages exchanged for setting up a casting session. These messages 390 are intercepted by the local proxy server 240 which relays them to the destination device. Such a message may contain the source MAC address, a destination MAC address, the source IP address, the destination IP address, a source port, a destination port, the communication protocol used and the message content. In this example a Google Chromecast target device is used.

A source device 210 may send an mDNS multicast discovery request message 392 for target devices connected to its VLAN, i.e. VLAN1. However, there are no target devices connected to VLAN1 as all target devices are connected to VLAN2 (and other VLANs, e.g. VLAN3) since the system 200 intentionally allows the connection of source and target devices to different VLANs.

The multicast discovery request message 392 is received by the local proxy server 240 as the local proxy server 240 is also connected to VLAN1.

The local proxy server 240 intercepts the multicast discovery request message 392 and relays it without any changes to the target devices connected to VLAN2 and to additional VLANs, e.g. VLAN3. This relay operation allows the transmitted multicast discovery request message 392 from the target device 210 connected to VLAN1 to be received by target devices connected to VLAN2. Target devices cannot otherwise receive the multicast discovery request message 392 because the message cannot propagate outside of VLAN1.

The discovery request message 392 comprises:
the MAC address of the source device 210 (<Device-MAC>)
the destination MAC address (a0:ce:c8:04:e5:3b) [a general MAC address used for multicasting]
the source device IP address (<Device IP>)
the destination IP address (224.0.0.251) [a general address used for multicasting]
the source communications port (5353)
the destination communications port (5353)
the communications protocol (MDNS) and
the message body (e.g. Standard query 0x0000 PTR_googlecast_tcp.local, QM"question" in the case of a Chromecast media playback device)

A target device 230 connected to VLAN2 receives the relayed multicast discovery request message 392 and replies with an mDNS multicast response message 394. The multicast response message 394 comprises:
the MAC address of the target device 230 (Chromecast-MAC)
the destination MAC address (a0:ce:c8:04:e5:3b) [a general MAC address used for multicasting—the same as in the discovery message 392]
the source device IP address (<ChromecastIP>)
the destination IP address (224.0.0.251) [a general address used for multicasting—the same as in the discovery message 392]
the source communications port (5353)
the destination communications port (5353)
the communications protocol (MDNS) and
the message body (Standard query response 0x0000 PTR Chromecast-a3b5554cf9b508843736218296f9b2a8._googlecast._tcp.local TXT, cache flush SRV, cache flush 0 0 Name: 8009 a3b5554c-f9b5-0884-3736-218296f9b2a8.local, Type: A, Address: <ChromecastIP>)

The multicast response message 394 can only be delivered to target devices connected to VLAN2 and the local proxy server 240, also connected to VLAN2. The source device that is connected to VLAN1 cannot receive the multicast response message 394 as the message 394 cannot propagate outside of VLAN2 where it originates. Additional multicast response messages may be received at the local proxy server 240 from other source devices that listened to the discovery request message 392 sent by the source device 210. These messages are also intercepted by the local proxy server 240.

The local proxy server 240 stores a set of network rules 376 which allow the delivery of IP packets to a destination (s). The application of the network rules 376 may allow a target device 230 to be discoverable by the source device 210 by allowing the local proxy server 240 to relay the multicast response message 394 from VLAN2 to VLAN1. For instance, the target device 230 can be discoverable by the source device 210 only if the target device 230 is associated with room 101 and the source device is also associated (after its registration) with room 101, thereby ensuring that a guest can only discover and pair his source device with target devices in his guest room.

Upon reception of the multicast response message 394, the local proxy server 240 applies its network rules. If the target device 230 is not allowed (i.e. is associated with a different guest room) to be discovered by and paired with the source device 210, then the local proxy server 240 ignores the intercepted message 394.

If the target device 230 is allowed to be discovered by and paired with the source device 210, then the local proxy server 240 modifies the intercepted message 394 to create a new fabricated mDNS response message 396 from the local proxy server 240 to the source device 210 by replacing:

the original multicast destination MAC address (a0:ce:c8:04:e5:3b) [a general MAC address used for multicasting] with the MAC address of the source device (<DeviceMAC>), thereby converting the multicast message to a unicast message that will only be received by the source device 210 the original source (i.e. the target device's 230) IP address (<ChromecastIP>) with the IP address of the local proxy server 240 (<CCProxyIP>) thereby allowing the source device to communicate with the local proxy server 240. This mechanism tricks the source device 210 to think that it communicates with the target device 230 as if both the source and target devices were connected to VLAN1 the multicast destination IP address (224.0.0.251) [a general address used for multicasting] with the (<DeviceIP>) so that the message is only delivered to the target device 210

The same network rules 376 are applied during content casting to regulate and control the casting from the source device 210 to the target device 230. During a casting session, network traffic comprises of two types:

Session protocol traffic, which carries the casted content and

Control protocol traffic, which carries control data used to control the session and the target device The session and control protocols are proprietary closed and potentially encrypted protocols defined by the manufacturer of the target device (e.g. Google Cast, Apple AirPlay, etc.) and therefore the protocols are not open to interpretation and/or editing by any third parties. However, the source and destination related fields in both the session and protocol packets can be read and interpreted by the local proxy server 240 (and other IP-compatible devices) and, thereby, the source and destination related fields can be used in the previously described mechanisms for discovering-initiating a casting session between a source and a target device and for managing and controlling content casting.

By applying its network rules 376, the local proxy server 240 can intercept control protocol traffic for regulating changes in the target device's 230 configuration. By such a mechanism, the local proxy server 240 can prohibit the source device 210 from modifying the configuration set by the hotel for the target device 230.

Connecting a Source Device via a General Internet Connection for Casting

In a modification to the present exemplary embodiment, the source device 210 may connect to the local proxy server 240 via a general Internet connection instead of a LAN (e.g. VLAN1) connection. In such an exemplary embodiment, an intermediate proxy server is added, e.g. in the form of a cloud service component. The intermediate proxy server may communicate with the local proxy server 240, where the local proxy server is connected to VLAN2 (and VLAN3, etc.) where the target devices are also connected.

The intermediate proxy server may communicate with the source device 210 via a software proxy agent component. The software proxy agent is installed at the source device 210 and can intercept and relay the discovery request message 392 sent from the source device 210 to the intermediate proxy server, and receive fabricated messages 396 from the intermediate proxy server.

This modified exemplary system may be used in a usage scenario where a remote source device, connected to the Internet, establishes a casting session with a target device located in a private LAN. By means of example, a first mobile device owned by a first user connects to the Internet. The first mobile device establishes a casting session with a media playback device, where the media playback device may belong to a friend of the first user and the media playback device may be located at the friend's house and connected to a private LAN (e.g. private WLAN).

The control server 250 may also be replaced by a cloud-based control server. The cloud-based control server may operate as a cloud control service that is accessible to the intermediate proxy server.

Content Casting Use Cases

Hotel Room Casting to a Single Target Device Scenario

A guest checks in at a hotel. His reservation is retrieved from the control server 250, which server may be a reservation system or other hotel information system located in the hotel premises or at some remote location like a head office of a hotel chain or other.

Upon checking-in the guest is associated with a guest room (e.g. 101) and potentially with services like pre-paid Internet access, telephone services pay-TV, etc. This information is stored at a database or other data structure at the control server 250.

After entering his room, the guest may switch on a TV located in his room (if not already automatically switched on directly by the control server 250 or via the local proxy server 240). The guest may access a menu on the TV and follow instruction to open a content casting session as previously described. Once authenticated, the guest's source device 210 (e.g. his smart phone) connects to the local proxy server 240 via VLAN1 and an application compatible with the casting protocol supported by the target device(s) 230 located in the guest's room. Once connected, the source device 210 may display a list of available target devices connected to TVs in the guest room. This list may contain target device that are associated with and located in the guest's room and may be populated with target device 230 and with additional target devices if such additional target devices are associated with the guest room. Data associating the user with the target devices may be accessed by the local proxy server 240 from the control server 250 or may also be stored at the local proxy server 240. The target devices that are displayed by the source device 210 are connected to the local proxy server 240 via VLAN2 and the local proxy server makes discoverable only the target devices that are associated with the guest and his source device (via his guest room association) by applying a set of network rules created using data from the control server 250.

The guest may select a target device 230 to pair with and cast content and the local proxy server will route the casting session protocol packets from the source device to the paired target device.

Based on its network rules the local proxy server 240 may block configuration protocol packets so as to prevent the source device from altering the configuration of the paired target device 230. In a variation of the present exemplary use case, the local proxy server 240 may allow the source device 210 to reconfigure the target device 230.

Hotel Room Casting to Multiple Target Devices Scenario

This is analogous to the single device casting scenario except that the user may select to cast to some or to all the target devices in his room. This may be done by selecting multiple devices from the available devices displayed at his source device 210 or by selecting a group containing all the devices in his room.

Public Space Casting Scenario

The user enters a public space like a conference hall, an exhibition area, a retail store or other public area. He performs the same authentication routine as in the hotel room scenarios and he is now presented with a list of target devices which are available. These devices are for public use and are, therefore, discoverable by any other source device connected to the same local proxy server as the user of the present scenario. The other source device may belong to other users at the same public space all competing for access to the target devices.

The local proxy server 240 and the control server 250 store data associating the user devices with user profiles. The two servers 249, 250 also store network rules; these rules are created so as to allow the local proxy server 240 to manage user profiles and casting traffic. Such user profiles may be associating user devices with users allowed to cast content only at specific time slots e.g. during a scheduled presentation at a conference room or at an exhibition area.

In the case of a retail store, users may correspond to sales or marketing staff, which staff is allowed to trigger the display of advertisements and/or incentives for luring customers and turning them into buyers. By means of example, such an advertisement or incentive may be casted by a registered staff's source device to all or a subset of target devices connected with TVs in the retail store after the staff recognizing a user(s) showing interest in a category of products or approaching an area in the retail space. The choice for the content to cast and for the target devices may be manually made by the registered staff using rules stored at the control server 250 and/or the local proxy server 240 and optionally data from sensors (e.g. cameras, proximity sensors, etc.) tracking the user in the retail space and combined with customer profiles, customer behavior, product location maps and other data.

For example, the system identifies that a client is near a product family stand and notifies a salesperson. The salesperson casts a promotional offer to a monitor(s) near the client for helping the client decide to buy one of the products in the product family. In another example, the system may sense that the client is located near a first product family stand. The system knows that no users have approached a second nearby product family stand for a predefined time (e.g. 1 hour). The system may then notify a salesperson and the salesperson may casts advertisements and/or offers to media playback devices near the user for directing him to the second nearby product family stand.

Shared-Access Streaming Channel Scenario

In this scenario, the user is allowed to cast, as in the previous scenarios, but is also allowed to create a streaming channel for a limited time period by controlling access to a target device that is connected to a streaming encoder resource (e.g. a streaming channel from his source device). Once authorized, the user can use his source device to stream to a single device or to multiple devices in public or private spaces.

In a variation of the present scenario, the user may instruct the local proxy server to cast streaming content from a web-based streaming channel or other similar resource to the selected target device(s). Under this scenario the target device may send a link to the local proxy server 240 (e.g. an HTTP link, or IP address, or other) instead of streaming the content itself. Upon reception of the link, the local proxy server 240 may connect to the corresponding resource and stream the content requested by the user device 210 to the paired target device(s).

Remote Device Casting Scenario

In the previous scenarios the source device 210 connects to the local proxy server 240 via VLAN1 and the target devices via VLAN2 or another LAN. In the present scenario the source device may connect to the local proxy server 240 via a general Internet connection. This may be useful in cases where the source device is remote to the target device(s) and, therefore, the source device cannot access VLAN1 or other LAN that the local proxy server is connected to.

The user of the source device may use such a scenario to connect to the Internet and pair with and cast content to a target device(s) (e.g. the target device of a member of his family, or a friend, or business partner, or client). The target device(s) may be connected to a private LAN (e.g. a private VLAN at the friend's home or office, which private VLAN is away from the vicinity of the user).

This scenario uses the system 200 of FIG. 2 and other additional components described above under the "Connecting a source device via a general Internet connection for casting" section. These additional components comprise an intermediate proxy server (e.g. in the form of a cloud service component) connected to the local proxy server 240, and a software proxy agent installed at the source device 210. The software proxy agent intercepts and relays the discovery request messages 392 sent from the source device 210 to the intermediate proxy server and receives fabricated messages 396 from the intermediate proxy server.

The control server 250 may also be replaced by a cloud-based control server. The cloud-based control server may operate as a cloud control service that is accessible to the intermediate proxy server.

Alternative Exemplary Implementation of Casting Management for Networks with Limited Rooting Capabilities The previously described exemplary implementations use proxy servers to reroute network packets. These implementations intercept such (control and data) packets and alter their source and/or destination addresses, port numbers etc. so as to make the respective source and target devices communicate across networks in a managed manner (ie control which source device is allowed to communicate with which target device) despite the fact that they are in separate physical or virtual networks from each other. This solution to managing casting between source and target devices is based on the underlying IP routing (or Layer 3 packet forwarding) functionality of the network infrastructure. Such networks and the corresponding infrastructures may vary among installation sites and typically vary e.g. from one hotel to another or other sites. Furthermore, since these networks are often inaccessible for modification and may also contain legacy infrastructures, their IP packet routing (or Layer 3 packet forwarding) functionality may vary.

As such, the previous exemplary embodiments simply filter and modify IP source and destination header data (and do not modify message content) sent from either guest devices or target devices rely on IP routing mechanisms to deliver the packets and assume the underlying network infrastructure is capable of doing so.

In practical applications it is the case that many networks lack this required IP routing (or Layer 3 packet forwarding) functionality. This is especially true in the case of Hotel networks for Guest Internet access where the equipment used to provide guest Internet access (and which is not accessible or not available for upgrades) does not permit such desired routing functionality.

The solution to this problem is presented in the following alternative exemplary implementations, illustrated in FIGS. 5A and 5B and FIG. 6. The following two alternative exemplary implementations do not rely on the routing (or Layer 3 packet forwarding) capabilities of either network (i.e. guest device network or target device network). Instead, they rely exclusively on Layer 2 packet forwarding functionality (ie ethernet network packet forwarding) and employ different mechanisms depending on the underlying network capabilities to allow for a solution to work in different environments.

More specifically, the alternative exemplary embodiments implement support for two discovery protocols: mDNS and SSDP (a more legacy but still used protocol). It is stressed that these two protocols are presented by means of example and are by no means intended to limit the scope of the present innovative solution. As a result, other protocols may be used in alternative implantations of the present innovative solution.

To overcome the IP routing restrictions of the underlying network(s), the casting proxy emulates or proxies requests/responses to/from guest devices/target devices. That is the casting proxy appears now as one or more target devices on the guest device network (N1 network).

Figure 5A:
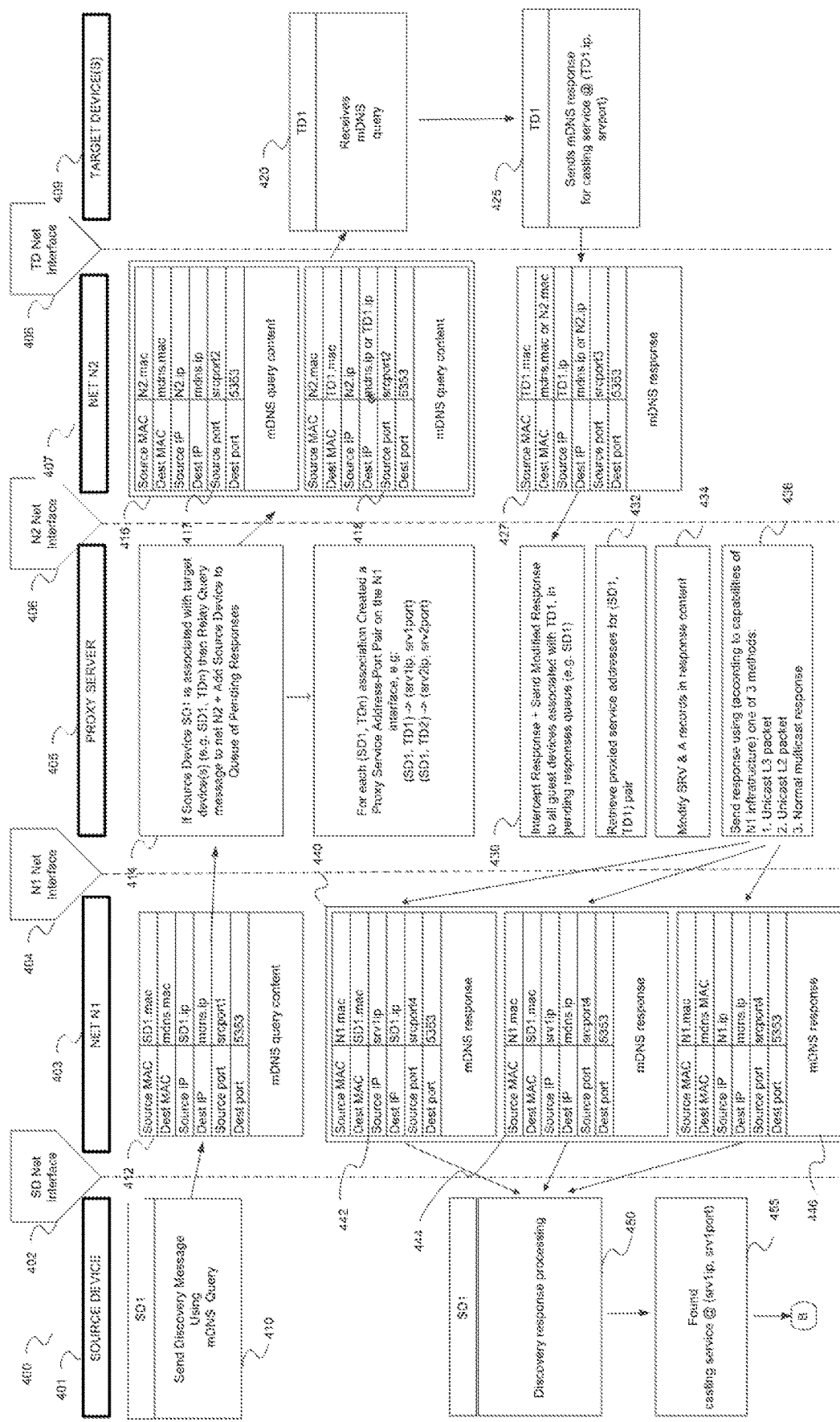
FIGS. 5A and 5B are an operational flow diagram illustrating casting management in accordance with an alternative exemplary embodiment of the present innovative solution, using the multicast Domain Name System (mDNS) protocol.
Figure 5B:
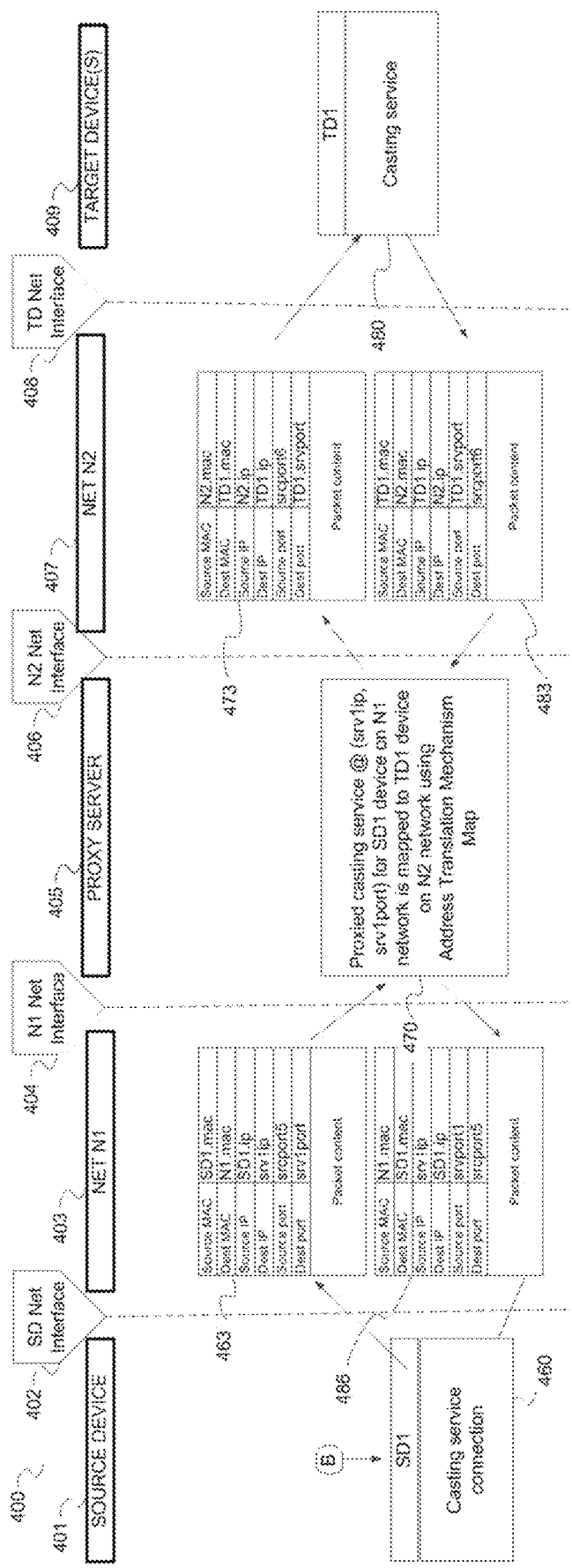
Figure 6:
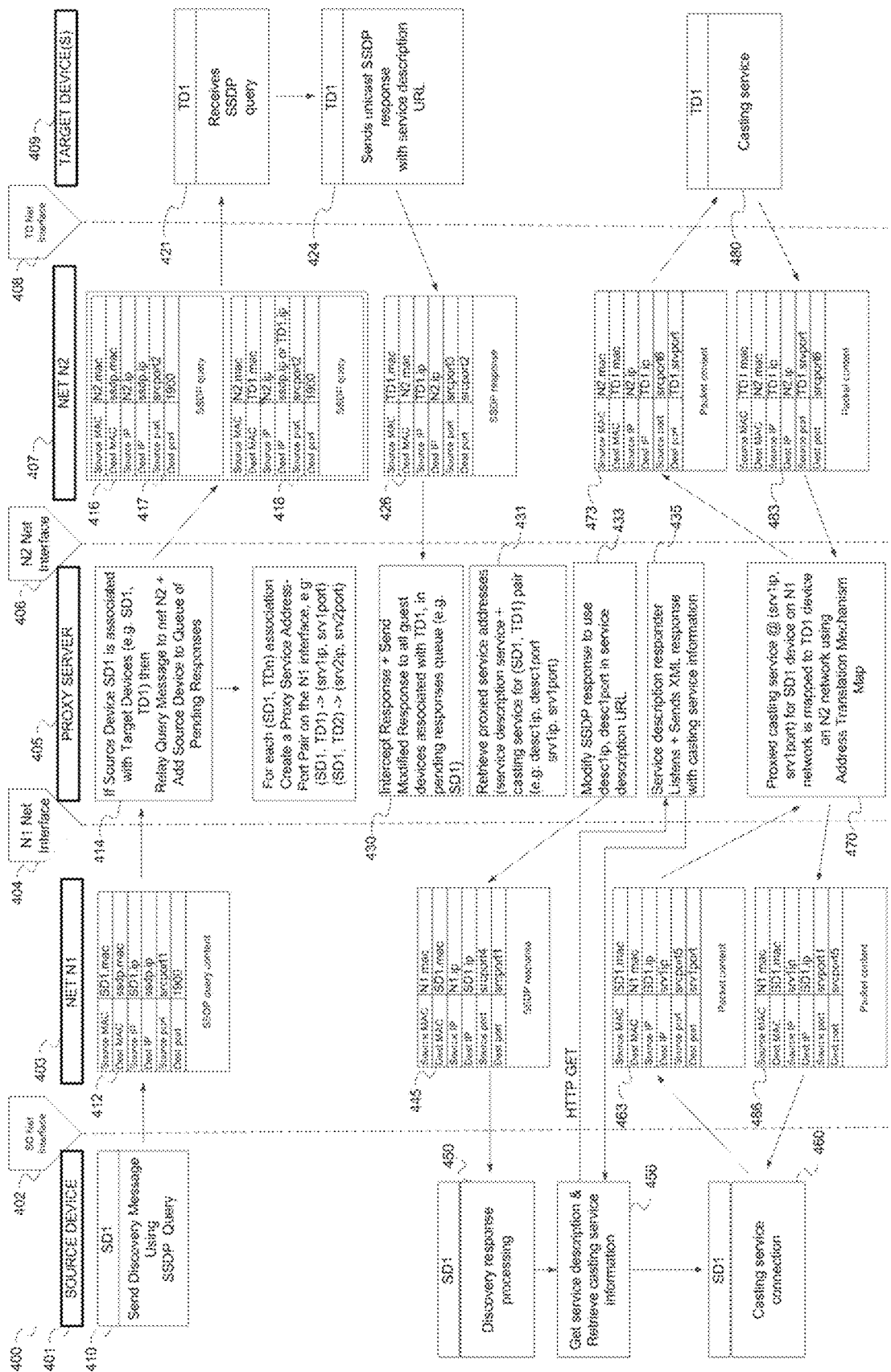
FIG. 6 is an operational flow diagram illustrating casting management in accordance with an alternative exemplary embodiment of the present innovative solution, using the Simple Service Discovery Protocol (SSDP).

Guest Source Devices searching for a Target Device to cast content to will discover a virtual casting target device appearing to be on the same Layer 2 network they are connected to (Guest network or N1 network in FIGS. 5A and 5B and FIG. 6

The casting proxy implements functionality to proxy any communication from the Guest Source Device (SD) which is directed to the virtual casting target device on the N1 network to a real Target Device (TD) on the target devices network (N2 network). Similarly for the return communication from Target Device to Guest Source Device.

Since some network information of the Target Devices (service IP addresses and ports) is included inside the content of packets exchanged it is necessary in some cases for the casting proxy to manipulate the content of the packets and replace this information with information for the virtual target device.

It is also necessary for the casting proxy to configure an address translation mechanism mapping virtual target device IP addresses and ports to actual Target Device IP addresses and ports. This is implemented using available Network Addressing Translation (NAT) tools in the implementation platform.

The casting proxy presents itself as multiple virtual Target Devices for the same Guest Source Device to allow for the case where a Guest Source Device is associated with multiple Target Devices at the same time.

In addition, a single virtual Target Device instance on the casting proxy can appear as a different Target Device to different Guest Source Devices minimizing the required instances of virtual Target Devices. This is achieved by maintaining mappings between Guest Source Devices, virtual Target Devices and actual Target Devices and appropriately handling network communication traffic according to the underlying protocol implementation.

mDNS Protocol Based Networks

FIGS. 5A and 5B are operational flow diagram illustrating casting management in accordance with an alternative exemplary embodiment of the present innovative solution, using the multicast Domain Name System (mDNS) protocol. Flow diagram 400 starts in FIG. 5A and continues in FIG. 5B.

In FIG. 5A flow diagram 400 shows the exchange of IP packets between a source device 401, a network N1 403, a proxy server 405, a network N2 407 and Target Device(s) (TD) 409. A Source Device (SD) network interface 402 is between SD 401 and network N1 403, a N1 network interface 404 is between network N1 403 and proxy server 405, a N2 network interface 406 is between proxy server 405 and network N2 407, and a TD network interface 408 is between net N2 407 and TD 409.

SD 410 sends 410 a discovery message using an mDNS query to network N1 403. The discovery message has the form of IP packet 412 and contains the source MAC and IP addresses and communications port of SD 401, and the destination MAC and IP addresses and communications port of mDNS service (mDNS.mac, mDNS ip), together with an mDNS query content.

Packet 412 is forwarded by network N1 403 to proxy server 405. Proxy server 405 checks if SD MAC address (e.g. SD1.mac) is associated with a target device(s).

If an association exists (e.g. SD1, TDn), proxy server 405 relays query message packet 412 to network N2 407 and adds the (guest) target device TDn to a queue of pending responses.

For each (SD1, TDn) association proxy server 405 creates a proxy service address-port pair on N1 interface 404 [e.g. (SD1, TD1)→(srv1ip, srv1port), (SD1, TD2)→(srv2ip, srv2port)].

Before proxy server 405 relays query message packet 412 to network N2 407, proxy server 405 modifies the source MAC and IP addresses and communications port of SD 401, with the source IP and MAC addresses and communications ports 416 of network interface 406 in N2 407. Packet 416 can be a multicast packet 417 (in which case destination MAC and IP remain unmodified) or a unicast packet 418, where in the case of unicast packet 418, the destination MAC and IP addresses are those of a specific target device (e.g. TD1) in the case that TD supports unicast packet reception. Unicast packet delivery option can be utilized to reduce overall network packet load on N2 407 as with multicast delivery the packet is delivered on all target devices present on N2 407 and subsequently a response is generated by all the target devices where in the case of unicast delivery only a single response is generated by the specific target device to which the query message packet is sent.

Modified IP packet 416 is received by TD1 420, which identifies it as originating from within its network N2 407 instead of the network N1 403 of the original IP packet 412. As a result communication (i.e. visibility) between SD1 401 and TD1 409 is achieved despite the fact that they belong to different networks (N1 403 and N2 407).

TD1 409, therefore, receives 420 the mDNS query of SD1 401 and sends 425 an mDNS response for casting service @(TD1.ip, srvport) to network N2 407. The mDNS response is sent either in Unicast or Multicast depending on the functionality of TD1 409. The response is in the form of IP packet 427, which contains the source MAC and IP addresses and communications port of TD1 409, and the destination MAC and IP addresses and communications port of proxy server network interface 406, together with an mDNS response.

Packet 427 is forwarded by network N2 407 to proxy server 405. Proxy server 405 intercepts 430 IP packet 427, checks its source (i.e. TD1 407) and sends a modified response to all guest devices (e.g. SD1 401) associated with TD1 407 in network N1 403, which guest devices are in the pending responses queue. Proxy server 405 retrieves 432 the proxied service addresses for the (SD1, TD1) pair (e.g. srv1ip, srv1port) and as a result the casting service @(Td1.ip, srvport) on network N2 407 is proxied for device SD1 401 @(srv1ip, srv1port) on network N1 403.

Proxy server 405 then modifies 434 the "SRV" & "A" records in the response content of the received IP packet 427. For example, for TD1 407 response relayed to SD1 401, the SRV record port number=srv1port and the "A" record IP address=srv1ip.

Proxy server 405 sends 436 modified response IP packet 440 to SD1 401. IP packet 440 is either a Unicast L3 packet 442, or Unicast L2 packet 444, or a multicast response packet 446. The choice among packets 442, 444, and 446 depends on the capabilities of network N1's 403 infrastructure.

SD1 410 receives and processes 450 the received discovery response (i.e. modified IP packet 440) and finds casting service @(srv1ip, srv1port) 455 (B).

Continuing in FIG. 5B (B), SD1 401 opens a casting service connection 460 and sends packet 463 to network N1 403 with its source addresses and communications port of SD1 and the destination addresses and communications port of (srv1ip, srv1port) on network interface 404.

Proxy server 405 intercepts packet 463 and maps the proxied casting service @(srv1ip, srv1port) for SD1 401 on network N1 403 to TD1 401 on network N2 407 using the address translation mechanism map (SD1.ip, srvlip, srcport5, srv1port)→(N2.ip, TD1.ip, srcport6, srvport), (srv1ip, SD1.ip, srv1port, srcport5)←(TD1.ip, N2.ip, srvport, srcport6). This mapping creates modified packet 473, which is then forwarded by proxy server 405 to TD1 409. Upon reception of packet 473, TD1 409 opens a casting service 480 and sends a response casting packet 483 to network N2 407, which packet 483 is forwarded by network N2 407 to proxy server 405. Proxy server 405 applies 470 the above address translation mechanism map to packet 483 to create modified packet 486 and transmits packet 486 via network N1 403 to SD1's 401 casting session 460.

SSDP Protocol Based Networks

FIG. 6 is an operational flow diagram illustrating casting management in accordance with an alternative exemplary embodiment of the present innovative solution, using the Simple Service Discovery Protocol (SSDP).

In FIG. 6 flow diagram 400 shows the exchange of IP packages between a source device 401, a network N1 403, a proxy server 405, a network N2 407 and Target Device(s) (TD) 409. A Source Device (SD) network interface 402 is between SD 401 and network N1 403, a N1 network interface 404 is between network N1 403 and proxy server 405, a N2 network interface 406 is between proxy server 405 and network N2 407, and a TD network interface 408 is between net N2 407 and TD 409.

SD 401 sends 410 a discovery message using an SSDP query to network N1 403 The discovery message has the form of IP packet 412 and contains the source MAC and IP addresses and communications port of SD 401, and the destination MAC and IP addresses and communications port of SSDP service (ssdp.mac, ssdp.ip), together with an SSDP query content.

Packet 412 is forwarded by network N1 403 to proxy server 405. Proxy server 405 checks if SD MAC address (e.g. SD1.mac) is associated with a target device(s).

If an association exists (e.g. SD1, TDn), proxy server 405 relays 414 query message packet 412 to network N2 407 and adds the source device SD1 to a queue of pending responses.

For each (SD1, TDn) association proxy server 405 creates a proxy service address-port pair on N1 interface 404 [e.g. (SD1, TD1)→(srv1ip, srv1port), (SD1, TD2)→(srv2ip, srv2port)].

Before proxy server 405 relays query message packet 412 to network N2 407, proxy server 405 modifies the source MAC and IP addresses and communications port of SD 401, with the source and destination IP and MAC addresses and communications ports 416 of network interface 406. Packet 416 can be a multicast packet 417 or a unicast packet 418, where in the case of unicast packet 418, the destination MAC and IP addresses and destination port are those of a specific target device (e.g. TD1) for the case that TD supports unicast packet reception.

Modified IP packet 416 or 418 is received by TD1 421, which identifies it as originating from within its network N2 407 instead of the network N1 403 of the original IP packet 412. As a result communication between SD1 401 and TD1 409 is achieved despite the fact that they belong to different networks (N1 403 and N2 407).

TD1 409, therefore, receives 421 the SSDP query of SD1 401 and sends 424 a unicast SSDP response with a service description URL to network N2 407. The response URL points to an emulated virtual IP packet 426, which contains the source MAC and IP addresses and communications port of TD1 409, and the destination MAC and IP addresses and communications port of network interface 406, together with an SSDP response.

Packet 426 is forwarded by network N2 407 to proxy server 405. Proxy server 405 intercepts 430 IP packet 426, checks its source (i.e. TD1 409) and sends a modified response to all guest devices (e.g. SD1 401) associated with TD1 409 in network N1 403, which guest devices are in the pending responses queue. Proxy server 405 retrieves 431 the proxied service addresses (i.e. for the service description service and for the casting service) for the (SD1, TD1) pair (e.g. desc1ip, desc1port and srv1ip, srv1port) and proxy server 405 modifies 433 the SSDP response to use (desclip, desc1port) in the service description URL and sends modified packet 445 to SD1 401.

SD1 401 receives and processes 450 the received discovery response (i.e. modified IP packet 445), gets 456 service description by sending an HTTP GET command (e.g. HTTP GET http://desc1:ip:desc1port/ssdp/device_desc.xml) to proxy server 405.

Upon reception of the HTTP GET command, a service description responder in proxy server 405 listens 435 @(desc1ip, desc1port) and sends an XML response with casting service information @(srv1ip, srv1port) to source device 401.

Source device 401 receives the casting service information @(srv1ip, srv1port) and so gets 456 the service description & retrieves the casting service information.

SD1 401 opens a casting service connection 460 and sends packet 463 to network N1 403 with its source addresses and communications port and the destination addresses and communications port of network interface 402.

Proxy server 405 intercepts packet 463 and maps the proxied casting service @(srv1ip, srv1port) for SD1 401 on network N1 403 to TD1 401 on network N2 407 using the address translation mechanism map (SD1.ip, srv1ip, srcport5, srv1port)→(N2.ip, TD1.ip, srcport6, srvport), (srv1ip, SD1.ip, srv1port, srcport5)←(TD1.ip, N2.ip, srvport, srcport6). This mapping creates modified packet 473, which is then forwarded by proxy server 405 to TD1 409. Upon reception of packet 473, TD1 409 opens a casting service 480 and sends a response casting packet 483 to network N2 407, which packet 483 is forwarded by network N2 407 to proxy server 405. Proxy server 405 applies 470 the above address translation mechanism map to packet 483 to create modified packet 486 and transmits packet 486 via network N1 403 to SD1's 401 casting session 460.

Software and Hardware Architectures Supporting the Innovative Solution

Figure 7:
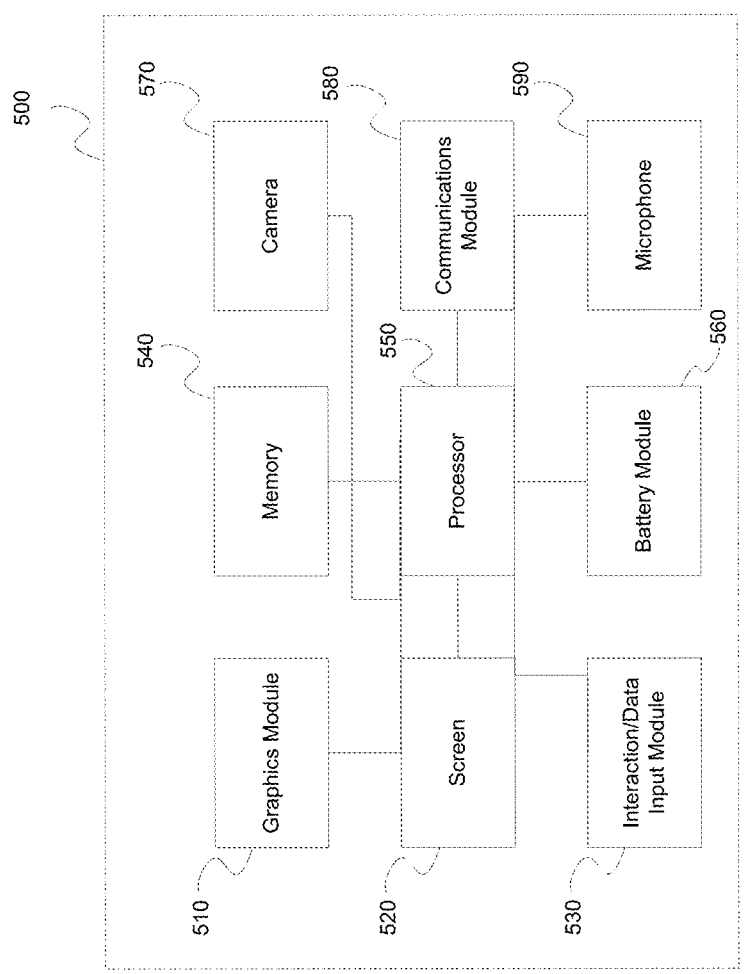
FIG. 7 shows a high level architecture of a source device.

FIG. 7 shows the architecture of a source device. The device 500 comprises a Processor 550 upon which a Graphics Module 510, a Screen 520, an Interaction/Data Input Module 530, a Memory 540, a Battery Module 560, a Camera 570 (in some exemplary embodiments the camera may be omitted), a Communications Module 580 (e.g. cellular, WiFi, Bluetooth, etc.), and a Microphone 590 (in some exemplary embodiments the microphone may be omitted).

The local proxy server 240 and the control server 250 may be of the same or a similar architecture as the source devices shown in FIG. 7 and both servers may comprise additional components or certain components may be omitted.

Target devices may be of the same or a similar architecture with the source device 500 but the target devices may lack certain modules like the screen 520, the interaction/data input module 530, microphone 590, battery module 560, and camera 570.

Figure 8:
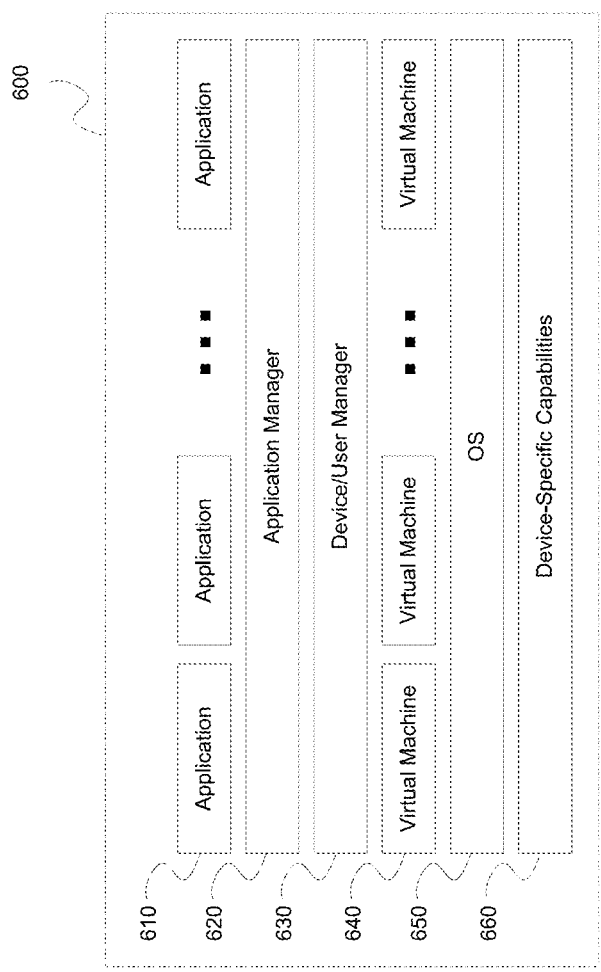
FIG. 8 shows the main Software Components of a source device.

FIG. 8 shows the main Software Components of a source device. At the lowest layer of the software components 600 are Device-Specific Capabilities 660, that is the device-specific commands for controlling the various device hardware components. Moving to higher layers lie an OS 650, Virtual Machines 640 (like a Java Virtual Machine or other), Device/User Manager 630, Application Manager 620, and at the top layer, the Applications 610. These applications may access, manipulate and display data. Some of these applications are compatible with the casting protocol used by the target devices; these applications can be used for content casting.

Target devices may use the same software components as shown in FIG. 8 for the source devices.

Figure 9:
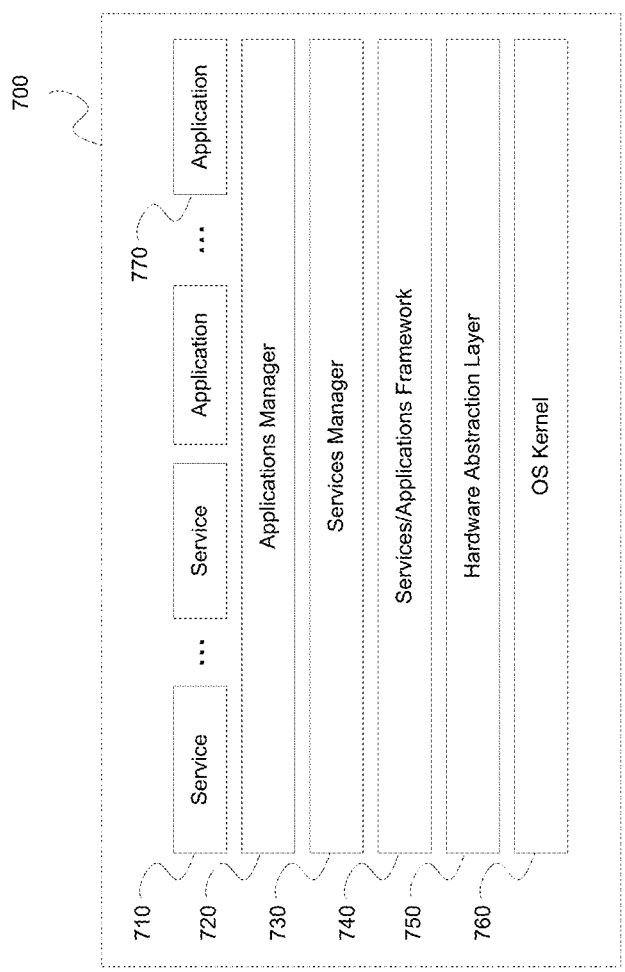
FIG. 9 shows the main Software Components of a Server.

FIG. 9 shows the main Software Components of a Server. This architecture 700 may be used for the local proxy server 240 and the control server 250. At the lowest layer is an OS Kernel 760 followed by a Hardware Abstraction Layer 750, a Services/Applications Framework 740, a Services Manager 730, an Applications Manager 720, and Services 710 and Applications 770.

It is noted, that the software and hardware components shown in FIG. 7, FIG. 8 and FIG. 9 are by means of example and other components may be present but not shown in these Figures, or some of the displayed components may be omitted. Other hardware and software may be possibly selected among known architectures. Especially for the server components, the local proxy server 240 and the control server 250 may be implemented as dedicated physical servers or as virtual server components running at a physical server.

The software running at any of the source and target devices, physical, virtual and cloud servers may be implemented in any computing language, or in an abstract language (e.g. a metadata-based description which is then interpreted by a software or hardware component). The software running in the above-mentioned hardware, effectively transforms a general-purpose or special-purpose hardware, or computing device, or system into one that specifically implements the present innovative solution.

The above exemplary embodiments are intended for use either as a standalone solution or as part of other methods, processes and systems.

The above exemplary embodiment descriptions are simplified and do not include hardware and software elements that are used in the embodiments but are not part of the current solution, are not needed for the understanding of the embodiments, and are obvious to any user of ordinary skill in related art. Furthermore, variations of the described method, system architecture, and software architecture are possible, where, for instance, method steps, and hardware and software elements may be rearranged, omitted, or new added.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of a preferred embodiment and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or any other device or apparatus operating as a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of managing content casting sessions between a source device and at least one media playback device, comprising:
    connecting the source device to a first network;
    connecting the at least one media playback device to a second network;
    relaying multicast service discovery messages from the source device to the at least one media playback device using address and port mapping to imitate the origin of the discovery messages as being inside the second network, the multicast service discovery messages being implemented with the mDNS protocol;
    receiving multicast service advertisement messages from the at least one media playback device, in response to receiving at the at least one media playback device the relayed service discovery messages sent by the source device, the multicast service advertisement messages being implemented with the mDNS protocol;
    applying network rules to relay or block service advertisement messages from the at least one media playback device to the source device;
    modifying the multicast service advertisement messages from the at least one media playback device by converting the multicast service advertisement messages from the at least one media playback device to one of unicast L3, unicast L2, or multicast service advertisement packets by changing message content and using address and port mapping to imitate the origin of the advertisement messages as being inside the first network;
    modifying SRV and A records in the service advertisement messages;
    sending the modified service advertisement messages to the source device;
    authorizing the source device for connection to the at least one media playback device;
    pairing the source device with the at least one media playback device;
    applying network rules to regulate casting session protocol traffic and casting configuration protocol traffic; and
    opening a media casting session between the paired devices using virtual IPs and communication ports and performing Network Address Translation to transport session packets between the source device and the media playback device which devices are on different Layer 2 networks without a Layer 3 route between them.

2. The method of claim 1, where the multicast service discovery messages and the multicast service advertisement messages are implemented with the SSDP protocol, the method further comprising:
    proxying service description services and casting services upon receiving the service advertisement messages;
    modifying the service advertisement messages to include a service description URL pointing to an emulated virtual service IP and communication port on the first network; and
    using the service description URL at the source device to fetch casting service information.

3. The method of claim 1, where the authorization of the source device and the creation or updating of the network rules is done using data received from a control component.

4. The method of claim 3, where a first media playback device is connected to the second network and a second media playback device is connected to a third network.

5. The method of claim 4, where the first, second and third networks are local area network or wireless local area networks.

6. The method of claim 5, where the first network is the Internet, and where the network traffic is first forwarded to a cloud based proxy component, and then to a proxy agent at the source device.

7. The method of claim 3, where the source device and the at least one media playback device are located in a hotel guest room, the control component is a service management component connected to a hotel reservation or ERP system, and the source device is casting media content to the at least one media playback device, or the source device sends a network address where the media content for casting is stored.

8. The method of claim 3, where the source device casts streaming media content to the at least one media playback device, or the source device sends the network address, where the streaming media content is stored, for casting the streaming media content to the at least one media playback device.

9. A proxy server configured to manage content casting sessions between a source device and at least one media playback device, the proxy server comprising:
    a memory for storing computer readable code; and
    a processor operatively coupled to the memory, the processor being configured to:
        connect with the source device via a first network;
        connect with the at least one media playback device via a second network;
        relay multicast service discovery messages from the source device to the at least one media playback device using address and port mapping to imitate the origin of the discovery messages as being inside the second network, the multicast service discovery messages being implemented with the mDNS protocol;
        receive multicast service advertisement messages from the at least one media playback device in response to receiving at the at least one media playback device the relayed service discovery messages sent by the source device, the multicast service advertisement messages being implemented with the mDNS protocol;

apply network rules to relay or block service advertisement messages from the at least one media playback device to the source device;

modify the multicast service advertisement messages from the at least one media playback device by converting the multicast service advertisement messages from the at least one media playback device to one of unicast L3, unicast L2, or multicast service advertisement packets by changing message content and using address and port mapping to imitate the origin of the advertisement messages as being inside the first network;

modify SRV and A records in the service advertisement messages;

send the modified service advertisement messages to the source device;

authorize the source device for connection to the at least one media playback device;

pair the source device with the at least one media playback device;

apply network rules to regulate casting session protocol traffic and casting configuration protocol traffic; and open a media casting session between the paired devices using virtual IPs and communication ports and perform Network Address Translation to transport session packets between the source device and the media playback device which devices are on different Layer 2 networks without a Layer 3 route between them.

10. The proxy server component of claim 9, where the multicast service discovery messages and the service advertisement messages are implemented with the SSDP protocol, the proxy server component further comprising:

network filtering rules for proxying service description services and casting services upon receiving the service advertisement messages;

network filtering rules for modifying the service advertisement messages to include a service description URL pointing to an emulated virtual service IP and communication port on the first network; and a service description responder for using the service description URL at the source device to fetch casting service information.

11. The proxy server component of claim 9, where the network filtering rules for authorizing the source device and the data structures for applying the network rules comprise using data received from a control component, the first network is the Internet, the proxy server component forwards the network traffic to a cloud based proxy component, and the cloud based proxy component forwards the network traffic to a proxy agent at the source device.

12. A non-transitory computer readable medium for managing content casting sessions between a source device and at least one media playback device, the non-transitory computer readable medium containing program instructions to:

connect a proxy server component with the source device via a first network;

connect the proxy server component with the at least one media playback device via a second network;

relay multicast service discovery messages from the source device to the at least one media playback device using address and port mapping to imitate the origin of the discovery messages as being inside the second network, the multicast service discovery messages being implemented with the mDNS protocol;

receive multicast service advertisement messages from the at least one media playback device in response to receiving at the at least one media playback device the relayed service discovery messages sent by the source device, the multicast service advertisement messages being implemented with the mDNS protocol;

apply network rules to relay or block service advertisement messages from the at least one media playback device to the source device;

modify the multicast service advertisement messages from the at least one media playback device by converting the multicast service advertisement messages from the at least one media playback device to one of unicast L3, unicast L2, or multicast service advertisement packets by changing message content and using address and port mapping to imitate the origin of the advertisement messages as being inside the first network;

modify SRV and A records in the service advertisement messages;

send the modified service advertisement messages to the source device;

authorize the source device for connection to the at least one media playback device;

pair the source device with the at least one media playback device;

apply network rules to regulate casting session protocol traffic and casting configuration protocol traffic; and open a media casting session between the paired devices using virtual IPs and communication ports and performing Network Address Translation to transport session packets between the source device and the media playback device which devices are on different Layer 2 networks without a Layer 3 route between them.

13. The non-transitory computer readable medium of claim 12, where the multicast service discovery messages and the service advertisement messages are implemented with the SSDP protocol, the non-transitory computer readable medium further containing program instructions to:

proxy service description services and casting services upon receiving the service advertisement messages;

modify the service advertisement messages to include a service description URL pointing to an emulated virtual service IP and communication port on the first network; and use the service description URL at the source device to fetch casting service information.

14. The non-transitory computer readable medium of claim 12, where (a) the authorization of the source device and the creation or updating of the network rules is done using data received from a control component, (b) the first network is the Internet, and the non-transitory computer readable medium further comprising a first set of program instructions to forward the network traffic to a cloud based proxy component, and a second set of program instructions to forward the network traffic from the cloud based proxy component to a proxy agent at the source device.

* * * * *